United States Patent [19]

Biglione et al.

[11] Patent Number: 4,980,417
[45] Date of Patent: Dec. 25, 1990

[54] POLYMERIC BLENDS BASED ON VINYL-AROMATIC POLYMERS

[75] Inventors: Gianfranco Biglione, Mantova; Gian C. Fasulo, San Silvestro di Curtatone, both of Italy

[73] Assignee: Montedipe S.p.A., Italy

[21] Appl. No.: 372,186

[22] Filed: Jun. 26, 1989

Related U.S. Application Data

[63] Continuation of Ser. No. 119,280, Nov. 9, 1987, abandoned, which is a continuation of Ser. No. 830,124, Dec. 18, 1986, abandoned.

[30] Foreign Application Priority Data

Feb. 18, 1985 [IT] Italy .............................. 19553 A/85

[51] Int. Cl.$^5$ .............................................. C08L 75/04
[52] U.S. Cl. ...................................... 525/125; 525/130
[58] Field of Search .................................. 525/125, 130

[56] References Cited

U.S. PATENT DOCUMENTS 3,970,717 7/1976 Müller-Albrecht .................. 525/66

FOREIGN PATENT DOCUMENTS 0012343 6/1980 European Pat. Off. ............ 525/130

*Primary Examiner*—Ana L. Carrillo
*Attorney, Agent, or Firm*—Morgan & Finnegan

[57] ABSTRACT

A polymeric blend based on vinyl-aromatic polymers having high impact resistance and including a thermoplastic polyurethane, a vinyl-aromatic copolymer containing an ethylenically unsaturated nitrile and a rubber, and a vinyl aromatic polymer, all present in specified amounts.

4 Claims, No Drawings

POLYMERIC BLENDS BASED ON VINYL-AROMATIC POLYMERS

This application is a Continuation of application Ser. No. 119,280, filed Nov. 9, 1987, which is a Continuation of application Ser. No. 830,124, filed Dec. 18, 1986, now both abandoned.

1. Field of the invention.

The present invention relates to polymeric blends based on vinyl-aromatic polymers having a high impact resistance. More particularly, the present invention relates to polymeric blends based on vinyl-aromatic polymers having a high impact resistance, a high degree of flexibility and a good resistance to wear.

2. Description of the Prior Art.

As known, the vinyl-aromatic polymers are thermoplastic resins suitable to be transformed into shaped bodies by injection or extrusion molding. Said vinyl-aromatic polymers have a fair tenacity but they are not suitable for use in applications where a high impact resistance, a high degree of flexibility and a good resistance to wear are required.

Our particularly appealing route to improve the properties of the vinyl-aromatic polymers is through blending said vinyl-aromatic polymers with other polymers having the lacking properties to give a material with the desired combination of properties. This approach has been successful only in a limited number of cases. In fact, it has often been found that such blending results in combining the worst features of each component with the result being a material of such poor properties as not to be of any practical or commercial value.

The reasons for this failure are rather well understood and are due in part to the fact that not all the polymers are compatible with each other, and therefore do not perfectly adhere. As a result, interfaces are formed between the components of the blend and represent areas of severe weakness and breaking points.

Thus, for instance, the blending of a vinyl-aromatic polymer with a thermoplastic polyurethane, in order to improve the impact resistance, flexibility and wear resistance, did not yield satisfactory results. As a matter of fact, the shaped products obtained from such blend show poor physical-mechanical properties and delaminate superficially owing to the incompatibility of the two polymers.

SUMMARY OF THE INVENTION

We have found that the problems reported above and associated with vinyl-aromatic polymers and thermoplastic polyurethane blends can be overcome by including in the composition a compatibilizing agent consisting of a vinyl-aromatic copolymer containing copolymerized in the polymer chain from 2% to 20% by weight of an ethylenically unsaturated nitrile and a quantity not exceeding 15% by weight of a rubber.

The vinyl-aromatic copolymer, containing copolymerized units of an ethylenically unsaturated nitrile, not only exerts a compatibilizing action between the vinyl-aromatic polymers and the thermoplastic polyurethanes, but it is compatible in all the proportions with the thermoplastic polyurethanes.

The present invention is therefore directed to a polymeric blend comprising:

(1) from 10 to 90% by weight, with respect to the blend, of a thermoplastic polyurethane;

(2) from 90 to 10% by weight, with respect to the blend, of a vinyl-aromatic copolymer containing copolymerized from b 2% to 20% by weight of an ethylenically unsaturated nitrile and a quantity not exceeding 15% by weight of a rubber, and (3) from 0 to 80% by weight of a vinyl-aromatic polymer.

According to a presently preferred embodiment, the blends of the present invention comprise from about 10 to about 50% by weight of a thermoplastic polyurethane and from about 90% to about 50% by weight of a vinyl-aromatic copolymer containing copolymerized an ethylenically unsaturated nitrile. This latter copolymer may be substituted partially by a vinyl-aromatic polymer, provided that the blends have a content in modified copolymer not lower than 10% by weight.

The term "vinyl-aromatic polymer", as used herein is to be understood to include any solid thermoplastic polymer and respective copolymer essentially consisting of (i.e., containing chemically bound) at least 50% by weight of one or more vinyl-aromatic monomers of general formula:

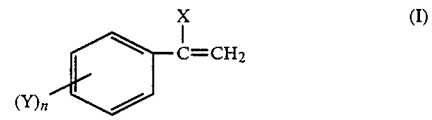

wherein X represents hydrogen or an alkyl radical having from 1 to 4 carbon atoms; n is zero or an integer from 1 to 5, and Y represents a halogen or an alkyl radical having from 1 to 4 carbon atoms.

Examples of vinyl-aromatic compounds of formula (I) are: styrene; methyl-styrene; mono-di, tri-, tetra- and penta-chloro-styrene and the respective alpha-methyl-styrenes; styrenes alkylated in the nucleus and the respective alpha-methyl-styrenes such as ortho- and para-methyl-styrenes, ortho- and para-ethyl-styrenes, ortho- and para-methyl-alpha-methyl-styrenes, etc. These monomers may be used either alone or in admixture with each other, or with other copolymerizable comonomers such as, for instance, maleic anhydride.

The term vinyl-aromatic polymers also includes the polystyrenes modified with rubbers, in general used for making the polymers impact or shock resistant, in quantities preferably comprised between 2% and 15% by weight.

The rubbers which are generally used for this purpose are: polybutadiene, poly-isoprene, copolymers of butadiene and/or isoprene with styrene or with other monomers, having a glass transition temperature (Tg) lower than $-20°$ C. or the saturated rubbers such as ethylene-propylene rubbers, ethylene-propylenediene terpolymers and silicon rubbers with unsaturated groups.

The vinyl-aromatic copolymer containing from 2% to 20% by weight of an ethylenically unsaturated nitrile and a quantity not greater than 15% by weight of a rubber of the type indicated hereinabove; differs from those described above only for the presence therein of the nitrilic unit, as a repeating unit. Concentrations of the ethylenically unsaturated nitrile below 15% by weight are preferred when the vinyl-aromatic polymer is present in the blend.

As ethylenically unsaturated nitrile it is to be understood, firstly and preferably, acrylonitrile, even if other ethylenically unsaturated nitrile monomers such as, for instance, methacrylonitrile, may be used.

The vinyl-aromatic copolymers may be obtained according to any known polymerization process such as suspension, bulk-suspension or continuous bulk polymerization, provided that a mixture of vinyl-aromatic monomers of general formula (I) and of an unsaturated nitrile, as starting monomers, are used.

Said vinyl-aromatic copolymers differ from the known acrylonitrile-butadiene-styrene resins, known as ABS resins, as far as the morphology, structure and size of the rubber particles dispersed in the rigid polymeric matrix are concerned. As consequence of such morphological, structural and dimensional differences, the vinyl-aromatic copolymers used in the blends of the present invention display a resilience or impact resistance far superior to that of the ABS resin, when the content in rubber is below 15%, and, preferably, less than 10% by weight.

The thermoplastic polyurethanes usable in the blends of this invention may be any of the conventional types and generally known in the art. More particularly, thermoplastic polyurethanes having a hardness comprised between 60 Shore A and 80 Shore D are used. Suitable thermoplastic polyurethanes useful in the practice of the invention are those known as polyurethanes from polyols, polyethers and/or polyesters, which are prepared from a great variety of polyols, diisocyanates and chain-extenders. The blends can also comprise mixtures of polyurethanes from polyesters and polyethers in any desired proportion.

The thermoplastic polyurethanes are commercially avaiable and are offered by numerous producers. In general, said thermoplastic polyurethanes consist of long-chain polyols having a molecular weight comprised between 400 and 10,000 of poly-isocyanates, preferably di-isocyanates, and of chain extenders, preferably short-chain polyols having a molecular weight of up to 400. In the polyurethane the equivalent ratio between isocyanate groups and active hydrogen atoms (NCO/OH) is preferably comprised between 0.95 and 1.1, and particularly between 0.98 and 1.08.

The substantially linear polyols having a molecular weight of between 400 and 10,000 and preferably comprised between 800 and 6,000, to be used in the preparation of the thermoplastic polyurethanes of the invention, include: any known polyester, polylactone, polyether, poly-thio-ether, polyester-amide, polycarbonate or polyacetal, containing two or, in small quantity, also three active groups generally in the form of hydroxyl groups; the vinyl polymers such as, for instance, polybutadiene-diols; poly-hydroxyl compounds containing urethane and urea groups, and other compounds containing different active groups such as amino-, carboxylic, thiolic groups, etc.

The polyols may be polyesters containing hydroxyl groups and prepared by condensation of glycols and aldicarboxylic acid such as adipic acid, phthalic acid and/or terephthalic acid and their hydrogenation products; hydroxylated polycarbonates; polycaprolactones; poly-ethylene oxide; polypropylene oxide, and mixed polyethers of ethylene oxide and propylene oxide, etc.

Polyesters of glycols and adipic acid and poly-caprolactone-diols are particularly preferred.

The organic di-isocyanates to be used in preparing the thermoplastic polyurethanes essentially comprise any aliphatic, cyclo-aliphatic, aromatic, aryl-aliphatic and heterocyclic diisocyanate. The particularly preferred di-isocyanates, according to the present invention, are: hexa-methylene-di-isocyanate, isophoron-di-isocyanate, di-phenyl-methane-di-isocyanate and naphthalene-1,5-di-isocyanate which may be substituted by methyl groups.

The above listed di-isocyanates may be used either alone or in admixture with up to 15% in mols of a higher polyisocyanate, however, in such a way that the product obtained is still meltable or thermoplastic.

The chain-extending agents used for the production of the polyurethanes, are well known and include the poly-alcohols, preferably glycols; polyamines, hydrazines, hydrazides, etc. Amino-alcohols such as ethanol amine, di-ethanol amine, triethanol amine, 3-amino-propanol, etc., may likewise be used. Preferred chain extending agents are: ethylene-glycol, di- and tri-ethylene-glycol, 1,4-butane-diole, 1,6-hexane-diole and hydroquinone-di-hydroxy-ethyl ether.

The polyurethanes used in the production of the blend of the present invention can include: rubber, antioxidizers such as 2,6-ter-butyl-4-methyl-phenol, sterically hindered phenols or amines, etc.

The polymeric blend of the present invention may be prepared at relatively low temperatures, in any known type of mixing unit. For instance, in single-screw or double-screw extruders, in Banbury mixers, or in mixing rollers, etc. During the mixing of the components there may be added fillers, glass fibers, pigments and other additives such as stabilizers, anti-flame agents, lubricants, anti-static agents, dyeing pigments, etc.

The present polymeric blends show a set of properties on the whole better than those of the single components. For this reason, these polymeric blends find a useful application wherever there is required high impact resistance combined with a high degree of flexibility and wear resistance. Said blends thus find an application in the automotive industry, in electronics and generally, in technical products.

The invention will be further described with references to the following illustrative but not limiting examples.

In the examples, all the facts are expressed by weight, unless otherwise indicated.

EXAMPLES 1–8

By means of a Bandera TR 45 single-screw extruder, having a length/diameter ratio of 25, there were extruded, with degasification and at a temperature of 200° C., blends consisting of:

a vinyl-aromatic copolymer having the following composition: 72% by weight of styrene, 12% by weight of alphamethylstyrene, 8% by weight of acrylonitrile and 8% by weight of polybutadiene rubber;

a shock-resistant polystyrene containing 8% by weight of a polybutadiene rubber;

a thermoplastic polyurethane, "GETHANE", sold by Messrs. GETIS of Vigevano (PV) Italy; and 0.1% by weight of the phenolic anti-oxidant, "IRGANOX 1070".

The ponderal ratios between the above three constituents have been recorded in the following table. By cutting the filaments coming from the extruder, granules were obtained which were dried for 2–4 hours at a temperature of 80°–90° C.

For the determination of the characteristics, the granules were injection molded at a temperature of 210° C., on a NEGRI & BOSSI V-17-110 FA injection molding press, in order to get test pieces having the dimensions requested by standard rules.

The properties measured on the thus obtained test pieces were recorded in the following table.

Example 1 was carried out for comparative purposes.

TABLE

|  | Standard Rule | Unita | \multicolumn{8}{c}{EXAMPLE NO.} |
|---|---|---|---|---|---|---|---|---|---|---|
|  |  |  | 1 | 2 | 3 | 4 | 5 | 6 | 7 | 8 |
| Polyurethane "GETHANE 1/98" % |  |  | 50 | 50 | 50 | 50 | 50 | 50 | 20 | 70 |
| Impact-resistant polystyrene % |  |  | 50 | 40 | 30 | 20 | 10 | — | — | — |
| Vinyl-aromatic copolymer % |  |  | — | 10 | 20 | 30 | 40 | 50 | 80 | 30 |
| CHARACTERISTICS |  |  |  |  |  |  |  |  |  |  |
| Resilience IZOD Test with indent | D 256 |  | 110 | 173 | N.R.(*) | N.R.(*) | N.R.(*) | N.R.(*) | 200 | N.R.(*) |
| TENSILE STRENGTH |  |  |  |  |  |  |  |  |  |  |
| Yield Stress | D 638 | Mpa | 15.5 | 16.0 | 15.5 | 14.4 | 15.5 | 14.5 | 20.0 | 12 |
| Breaking Point | D 638 | Mpa | 25.5 | 29.5 | 36.5 | 35.0 | 35.0 | 35.5 | 35.5 | 23 |
| Elongation at Break | D 638 | % | 115 | 211 | 226 | 231 | 219 | 227 | 120 | 350 |
| Elasticity Modulus | D 638 | Mpa | 800 | 800 | 750 | 650 | 600 | 500 | 900 | 410 |
| VICAT B (5 Kg. in oil) | ISO 306 | °C. | 82 | 82.5 | 81 | 83 | 82 | 83 | 90 | 78 |

(*) N.R. = Test piece does not break.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What we claim is:

1. A polymeric blend having a high impact resistance, a high degree of flexibility and a good resistance to wear, consisting essentially of:
   (1) from 10% to 90% by weight of a thermoplastic polyurethane having a hardness between 60 Shore A and 80 Shore D; and
   (2) from 90% to 10% by weight of a compatibilizing agent comprising of a vinyl-aromatic copolymer containing copolymerized in the polymer chain from 2% to below 15% by weight of an ethylenically unsaturated nitrile and not greater than 15% by weight of a rubber; and
   (3) from 0% to 80% by weight of a vinyl-aromatic polymer containing at least 50% by weight of one or more vinyl-aromatic monomers of the formula (I):

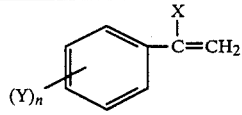

$$\tag{I}$$

wherein X is hydrogen or an alkyl with 1 to 4 carbon atoms; Y is a halogen or an alkyl with 1 to 4 carbons atoms; and n is zero or an integer from 1 to 5; with the proviso that the vinyl-aromatic polymer (3) does not contain an ethylenically unsaturated nitrile unit.

2. A polymeric blend according to claim 1, consisting essentially of from 10% to 50% by weight of said thermoplastic polyurethane and from 80% to 10% by weight of said vinyl-aromatic copolymer containing at least 2% but less than 15% by weight of an ethylenically unsaturated nitrile and not greater than 15% by weight of a rubber.

3. A polymeric blend according to claim 1, consisting essentially of at least 10% by weight of said vinyl-aromatic copolymer containing at least 2% but less than 15% by weight of an ethylenically unsaturated nitrile and not greater than 15% by weight of a rubber, the remainder of the blend consisting of a mixture of said thermoplastic polyurethane and said vinyl-aromatic polymer.

4. A polymeric blend according to claim 1, wherein the ethylenically unsaturated nitrile is acrylonitrile.

* * * * *